United States Patent Office 2,864,882
Patented Dec. 16, 1958

2,864,882

PLASTIC FILLER IN STRIP FORM AND ELECTRICAL CONNECTIONS COATED THEREWITH

Robert B. Snell, White Bear Lake, Minn., assignor to Minnesota Mining & Manufacturing Company, St. Paul, Minn., a corporation of Delaware No Drawing. Application July 6, 1953
Serial No. 366,391

12 Claims. (Cl. 174—84)

This invention relates to plastic coherent filler material in continuous strip or tape form, and has particular reference to electrically insulative plastic tape materials adapted for hand application in providing adherent close-fitting coverings on irregularly shaped cable-splices and other connections between electrical conductors. The plastic material fills all troughs and channels of the connection, conforms and lightly adheres to the surfaces of the conductors, and forms a tough, unitary, protective and insulative, smooth-surfaced base for the subsequently applied permanent outer protective covering.

The properties of the novel and useful product of this invention may conveniently be described in terms of its application in the covering of a split-bolt connector splice between heavy insulated stranded copper cables. A strip of the plastic filler 1½ inches wide, about ⅛ inch thick, and of any convenient length is hand-wound around the cable ends and connector under moderate tension sufficient to cause slight elongation of the strip, until all of the bare metal areas are covered with at least one thickness and the entire mass has a smoothly rounded contour. The process may be expedited by cutting or pulling a portion of the tape into short strips with which to fill the deeper troughs or valleys of the splice, the whole then being covered with one or more layers of the tape in lightly stretched condition to provide the desired smooth contour. The product is somewhat elastic, and the broken ends snap back when a strip is rapidly broken; but under more leisurely applied stress the strip stretches and flows in a plastic rather than elastic manner. The tape conforms and lightly adheres to the metal surfaces as well as to the adjacent edge portions of the rubbery or polymeric insulating covering on the cables, and the several layers cohere together to produce a unitary mass of plastic material, which retains its shape at room temperature and up to at least about 40° C. The plastic mass is readily shaped and smoothed by finger pressure during application, thus helping to force the plastic composition into the smaller interstices of the structure such as the channels between adjacent surface elements of the stranded conductor, the grooves of the threaded screw-connector, etc.

After the plastic filler is in place, the surface may be further sealed and protected by the application of a pressure-sensitive adhesive tape having a strong elastic vinyl polymer backing coated with a firmly bonded pressure-sensitive adhesive. Fibrous or fabric tapes or other coverings are also applicable, but the elastic film pressure-sensitive adhesive tapes offer a number of advantages, e. g. in terms of ease and universality of application.

From the foregoing it will be seen that the plastic filler tape of the present invention is required to be both coherent in itself and at least somewhat adherent to metal and other surfaces, stretchable in useful widths and thicknesses by simple hand pulling, plastic and moldable under ordinary hand working pressures and under normal working conditions while still retaining its shape under storage conditions, and easily torn into small segments while still being fully self-supporting and coherent in tape or strip form. The product must not soften and flow at moderately elevated temperatures and must not become brittle and non-usable at moderately low temperatures. It must not cause corrosion of the copper, aluminum, or other metallic components with which it is placed in contact, and must not cause softening of the cable insulation or of the pressure-sensitive adhesive tape protective covering. It must be highly resistant to moisture penetration. In addition to these several physical and chemical properties, the product should have a low dissipation factor and other desirable electrical characteristics.

In continuous tape form the plastic filler is convenient to apply and forms a smooth-surfaced protective mass without difficulty. In order that such a tape may be packaged, stored and shipped conveniently, it is provided with a removable and disposable interliner or slipsheet so that the combination may be wound up in convolute roll form. The tape must be readily and completely removable from such liner, although it adheres lightly thereto so that the liner remains protectively in place until deliberately removed.

The preparation of a plastic filler strip product in accordance with this invention will now be described in terms of a specific and presently preferred embodiment, serving to clarify but not to restrict the practice and scope of the invention.

*Example 1*

| | Parts by weight |
|---|---|
| Butyl rubber | 100 |
| Polyisobutylene | 10 |
| Polyethylene ("DYNH") | 12 |
| Diatomaceous earth | 60 |
| Heavy paraffin oil | 34 |
| Compatible tackifier resin | 8 |
| Carbon black | 5 |

The Butyl rubber is milled on a rubber mill and the polyisobutylene and polyethylene added. The diatomaceous earth ("Celite") and carbon black are next milled into the batch, followed by the resin and oil. The batch is then heated on the mill until the polyethylene and resin melt and blend homogeneously with the other ingredients, after which it is cooled, transferred to a calender or extruder, and there formed into a smooth sheet or strip of desired thickness, customarily about ⅛ inch. The thin strip is then laid on a suitable liner and the whole wound up on appropriate cores or mandrels into roll form. Crinkled parchment paper treated with silicone polymer to reduce the adhesion of the plastic strip to the surface thereof is an example of a preferred form of liner material, although other treated paper low-adhesion liners have been used and still other types of equivalent liner materials are applicable.

The product has a water absorption value of not greater than about 0.4%. The dielectric strength is about 350 volts per mil and its insulation resistance, measured at 96% relative humidity, is about 100,000 megohms. The dielectric constant is about 5.0 and the dissipation factor about 0.06, both at 90° C. and 60 cycles. The tape has a tensile strength, at 120 mils (0.120 inch) thickness, of about 3.5 lbs. per inch width, and an elongation at break of approximately 1500%, under a uniform moderately rapid pull. It adheres lightly to metal surfaces and more strongly to itself, in the latter case fusing together to form a homogeneous coherent mass.

Rather wide variations both in the specific ingredients employed and in their relative proportions may be successfully employed in providing acceptable plastic filler strip material, as will now be made apparent.

The Butyl rubber of the example is a copolymer of isobutylene and a minor proportion of a diene such as butadiene or isoprene, having a Mooney value of 30–40 and known as "GR–I 40". The polyisobutylene component employed is a high molecular weight rubbery polymer having a nominal molecular weight of about 100,000–120,000. The combination of Butyl rubber and polyisobutylene, which are fully compatible, provides a strong rubbery base which is particularly resistant to oxidation and similar deteriorative influences. Other rubbery hydrocarbon polymers such as electrical grade GR–S (rubbery butadiene-styrene polymer) and natural rubber may be substituted on a weight basis for the 110 parts of rubbery base in the example, with fully effective results under most conditions but with some reduction in ease of handling at low temperatures. Butyl rubber alone is ordinarily somewhat susceptible to cold flow and is desirably reinforced by the incorporation of the high molecular weight polyisobutylene, although some varities of Butyl rubber are adequate in this respect. Polyisobutylene having a molecular weight of about 60,000–80,000 is also useful as a rubbery base material.

Incorporation of a small proportion of polyethylene in these compositions has the surprising effect of reducing the dissipation factor of the product to a small fraction of its initial value. For example, the formula of the example in the absence of the polyethylene has a dissipation factor, at 60 cycles and 90° C. of about 0.26–0.30. With the polyethylene included, the dissipation factor is reduced to approximately 0.06, or about one-fifth the previous value. Less than about 3–4 parts, e. g. 2 parts of polyethylene appears to have little if any effect on the dissipation factor of the product. On the other hand, more than about 15 parts of polyethylene stiffens the mass to the point where it will no longer flow adequately under finger-pressure to conform to the surfaces of irregularly shaped articles such as split-bolt connectors. The larger amounts are also less compatible with the rubbery base. Hence it is necessary to maintain the amount of polyethylene between the approximate limits of 4 to 15 parts based on 100 parts of Butyl rubber and 10 parts of high molecular weight polyisobutylene or on 110 parts of other equivalent rubbery base, with the preferred proportion being about 6–12 parts of polyethylene on the same basis.

Polyethylene is a non-rubbery, water-resistant organic polymer. Other non-rubbery water-resistant polymeric additives are known which may be incorporated in the composition under analogous conditions and in substantially the same amounts, to provide an equally surprising and gratifying effect on electrical properties. The substitution of an equal weight of cellulose acetate for the 12 parts of polyethylene in the example provides a sheet product having a dissipation factor of about 0.05; with polystyrene, the value is 0.024. The same amount of chlorinated rubber reduces the value to about 0.10; carnauba wax, to about 0.17; and vinyl chloride:vinyl acetate copolymer ("Vinylite" VYNS) to about 0.22. On the other hand, "Carbo-wax," a water-soluble ethylene oxide polymer, in the same amount increases the dissipation factor beyond the value obtained in the absence of such polymeric additives, as does the vinyl copolymer when employed in the proportion of 30 parts instead of 12 parts.

The diatomaceous earth, present in the formula of the example to the extent of 60 parts by weight, provides a desirable stiffening action as well as serving as an economical filler. In the absence of a substantial proportion of such material the composition is too soft to be easily produced and maintained in tape form, and large lumps of such compositions have a tendency to sag or flow under their own weight, particularly at elevated temperatures. Within the approximate range of 40–80 parts the proportion of this or equivalent stiffening fillers is not critical.

Powdered mica or silica gel, the latter preferably being treated to render it hydrophobic as by treatment with organic silicon compounds or the like, are suggested as alternative inorganic powder materials. Clay and precipitated calcium carbonate have been found much less desirable, since, although they impart some stiffening action, the resulting product is rendered less water-resistant and less effective as electrical insulation material.

Fibrous fillers such as asbestine and short-fibered asbestos are not completely satisfactory with respect to water-resistance, although treatment with organic silicon compounds or the like provides some improvement; but these fibrous materials impart even more stiffness and strength than does diatomaceous earth and hence are useful as partial or complete replacements for the latter where the somewhat different combination of properties thus provided is applicable.

Paraffin oil is an aid in the processing of the batch on the mill and calender, and also imparts added plasticity and conformability to the plastic filler. Other inert liquid plasticizers, substantially non-volatile at normal room temperatures, are also effective, although non-polar plasticizers, particularly refined petroleum oils, are preferred, and in amounts of from about 25 to about 50 parts based on 110 parts of rubbery base as previously identified. With some formulas, and some methods of preparation, still less of this component is found to be adequate. However, the range of about 25–30 parts, based on paraffin oil, is preferred, since much more than 50 parts produces an excessively soft and plastic strip tending to flow away from projections in the spliced cable and having an adverse effect on many rubber-resin type pressure-sensitive tape adhesives, and less than about 25 parts produces a strip which is too stiff for effective hand application under the conditions normally experienced in service. The resinous tackifier in the case of the specific example is "Newport S" resin, a resinous alpha-pinene-substituted phenol. This component may in some cases be eliminated, although up to about 30 formula parts of this or other compatible resinous tackifier is found desirable in some compositions in order to obtain the desired degree of adhesion of the strip to metal surfaces as well as adequate self-bonding or cohesion properties. Among other resinous tackifiers which have been found useful in these compositions are "Piccolite S–115," a non-acidic thermoplastic terpene resin; wood rosin; coumarone-indene resins; and "Pentalyn A," a pentaerythritol abietate.

The presence of at least a small amount of both oily lubricant or plasticizer and resinous tackifier also assist in the formation of a smooth and well-knit band of the mixture on the mill rolls and calender rolls during processing.

Up to about 5 parts of carbon black is usually added in order to provide a pleasing, uniform appearance. Any larger amount is unnecessary, and tends to rub off on the fingers. However, this component may be omitted, or other pigments or coloring agents substituted, as desired.

The compositions here disclosed can be prepared in the form of slabs or similar massive shapes, and the material then removed therefrom either by cutting or tearing for use in filling around splices or for other applications. However, the conversion of the material to tape form as hereinbefore described, and the packaging of the tape in conveniently sized and readily unwound rolls, provides the user with a much more convenient and more rapidly applied product and results in substantial savings in time required for the protective coating of cable-splices and other electrical connections as well as for various other filling and smoothing operations.

What is claimed is as follows:

1. A plastic filler composition in strip form and removably adherently attached to a temporary liner, all as herein described, and suitable for application over irregular metal surfaces as an adherent filling material;

said composition in strip or lump form and at temperatures up to at least about 40° C. being non-flowing, but susceptible of plastic deformation by finger-pressure, being moderately adherent to metal and highly coherent to itself; in the form of a strip one-eighth inch in thickness and 1½ inches in width, being smoothly hand-stretchable to at least about ten times its original length, and having a tensile strength of the order of 3–5 lbs. per inch of width; having a water absorption value not greater than about 0.4%, a dielectric strength of at least about 30,000 volts at a thickness of one-eighth inch, and a dissipation factor not higher than about 0.10; said composition consisting essentially of about 110 parts by weight of a rubbery hydrocarbon polymer base at least mainly consisting of a rubbery copolymer of isobutylene and a diolefin in approximately the proportions of 98:2, about 40–80 parts siliceous particulate stiffener for said base, about 25–50 parts of heavy paraffin oil, about 5–30 parts of resinous tackifier, and about 4–15 parts of polyethylene.

2. A plastic filler tape about one-eighth inch thick, wound up in roll form with a temporary inter-liner, and capable of being unwound from the roll, removed from the liner, pulled or torn into desired length, and applied to cable splices or the like by hand operations whereby to form an adherent compact unitary insulating covering having a high dielectric strength and low dissipation factor and suitable as a base for the subsequent application thereover of stretchable and elastic polymeric pressure-sensitive adhesive tape in the insulating and protecting of said splices; said tape consisting essentially of the following components in approximately the indicated weight proportions:

Rubbery hydrocarbon polymer base at least mainly
  consisting of a rubbery copolymer of isobutylene
  and a diolefin in approximately the proportions
  of 98:2_____ 110
Polyethylene _____ 4–15
Diatomaceous earth_____ 40–80
Heavy paraffin oil_____ 25–50
Tackifier resin _____ 5–30

3. A plastic filler tape about one-eighth inch thick, wound up in roll form with a temporary inter-liner, and capable of being unwound from the roll, removed from the liner, pulled or torn into desired length, and applied to cable splices or the like by hand operations whereby to form an adherent compact unitary insulating covering having a high dielectric strength and low dissipation factor and suitable as a base for the subsequent application thereover of stretchable and elastic polymeric pressure-sensitive adhesive tape in the insulating and protecting of said splices; said tape consisting essentially of the following components in approximately the indicated weight proportions:

Rubbery copolymer of isobutylene and a diolefin in
  approximately the proportions of 98:2 and having
  a Mooney value of about 30–40_____ 100
Polyisobutylene having a molecular weight of at least
  about 60,000_____ 10
Polyethylene _____ 12
Diatomaceous earth_____ 60
Heavy paraffin oil_____ 34
Resinous alpha-pinene-substituted phenol_____ 8
Carbon black_____ 5

4. A plastic filler tape about one-eighth inch thick, wound up in roll form with a temporary inter-liner, and capable of being unwound from the roll, removed from the liner, pulled or torn into desired length, and applied to cable splices or the like by hand operations whereby to form an adherent compact unitary insulating covering having a high dielectric strength and low dissipation factor and suitable as a base for the subsequent application thereover of stretchable and elastic polymeric pressure-sensitive adhesive tape in the insulating and protecting of said splices; said tape consisting essentially of the following components in approximately the indicated weight proportions:

Rubbery copolymer of isobutylene and a diolefin in
  approximately the proportions of 98:2 and having
  a Mooney value of about 30–40_____ 100
Polyisobutylene having a molecular weight of at least
  about 60,000_____ 10
Polyethylene _____ 12
Diatomaceous earth_____ 60
Heavy paraffin oil_____ 34
Non-acidic thermoplastic terpene resin_____ 8
Carbon black_____ 5

5. An insulated and protected electrically conductive metallic connection between metallic conductors, having an irregular angular contour difficult to cover smoothly with conventional covering materials such as pressure-sensitive adhesive tape; said connection being preliminarily at least partially surrounded with a smoothly contoured, compact, unitary, close-fitting, adherent mass of a plastic filler composition having high dielectric strength and low dissipation factor, said mass consisting essentially of about 110 parts by weight of a soft rubbery hydrocarbon polymer base at least mainly consisting of a rubbery copolymer of isobutylene and a diolefin in approximately the proportions of 98:2, about 40–80 parts inorganic finely particulate stiffener for said base, about 25–50 parts of heavy paraffin oil and about 4–15 parts of polyethylene; and said mass surrounding the connection being further smoothly covered with a wrapping of stretchable elastic pressure-sensitive adhesive tape as a final protective covering.

6. A plastic filler composition in self-supporting coherent strip form and removably adherently attached to a flexible temporary liner, all as herein described, adapted to be readily stripped from the liner and applied over irregular metal surfaces by hand operations in the forming of adherent compact unitary electrically insulating coverings having high dielectric strength and low dissipation factor; said composition consisting essentially of about 110 parts by weight of a rubbery hydrocarbon polymer base at least mainly consisting of a rubbery copolymer of isobutylene and a diolefin in approximately the proportions of 98:2, about 25–50 parts of paraffin oil plasticizer, about 40–80 parts of inorganic finely particulate stiffener for said base, and about 4–15 parts of polyethylene.

7. A plastic filler composition in self-supporting coherent strip form and removably adherently attached to a flexible temporary liner, all as herein described, adapted to be readily stripped from the liner and applied over irregular metal surfaces by hand operations in the forming of adherent compact unitary electrically insulating coverings having high dielectric strength and low dissipation factor; said composition consisting essentially of about 100 parts of a rubbery copolymer of isobutylene and a diolefin in approximately the proportions of 98:2 and having a Mooney value of about 30–40, about 10 parts of polyisobutylene having a molecular weight of at least about 60,000, about 25–50 parts of paraffin oil plasticizer, about 40–80 parts of inorganic finely particulate stiffener, and about 4–15 parts of polyethylene.

8. An insulated and protected electrically conductive metallic connection between metallic conductors, having an irregular angular contour difficult to cover smoothly with conventional covering materials such as pressure-sensitive adhesive tape; said connection being preliminarily at least partially surrounded with a smoothly contoured, compact, unitary, close-fitting, adherent mass of a plastic, highly coherent filler composition adapted for hand application in the form of a self-sustaining strip or tape and having high dielectric strength and low dissipation factor, said mass consisting essentially of about 100 parts by weight of a rubbery copolymer of isobutylene and a diolefin in approximately the proportions of 98:2 and having a Mooney value of about 30–40, about 10 parts of polyisobutylene having a molecular weight of at least about 60,000, about 25–50 parts of heavy paraffin oil, about 40–80 parts of inorganic finely particulate stiffener, about 4–15 parts of polyethylene, and about 5–30 parts of tackifier resin; and said mass surrounding the connection being further smoothly covered with a wrapping of stretchable elastic pressure-sensitive adhesive tape as a final protective covering.

9. A plastic filler composition in self-supporting coherent strip form and removably adherently attached to a flexible temporary liner, all as herein described, adapted to be readily stripped from the liner and applied over irregular metal surfaces by hand operations in the forming of adherent compact unitary electrically insulating coverings having high dielectric strength and low dissipation factor; said composition consisting essentially of about 100 parts of a rubbery copolymer of isobutylene and a diolefin in approximately the proportions of 98:2 and having a Mooney value of about 30–40, about 10 parts of polyisobutylene having a molecular weight of at least about 60,000, about 4–15 parts of polyethylene, about 40–80 parts of inorganic finely particulate stiffener, about 25–50 parts of paraffin oil plasticizer, and about 5–30 parts of tackifier resin.

10. A plastic filler composition in self-supporting coherent strip form and removably adherently attached to a flexible temporary liner, all as herein described, adapted to be readily stripped from the liner and applied over irregular metal surfaces by hand operations in the forming of adherent compact unitary electrically insulating coverings having high dielectric strength and low dissipation factor; said composition consisting essentially of about 110 parts by weight of a rubbery hydrocarbon polymer base at least mainly consisting of a rubbery copolymer of isobutylene and a diolefin in approximately the proportions of 98:2, about 4–15 parts of polyethylene, about 40–80 parts of inorganic finely particulate stiffener, about 25–50 parts of paraffin oil plasticizer, and about 5–30 parts of tackifier resin.

11. An insulated and protected electrically conductive metallic connection between metallic conductors, having an irregular angular contour difficult to cover smoothly with conventional covering materials such as pressure-sensitive adhesive tape; said connection being preliminarily at least partially surrounded with a smoothly contoured, compact, unitary, close-fitting, adherent mass of a plastic, highly coherent filler composition adapted for hand application in the form of a self-sustaining strip or tape and having high dielectric strength and low dissipation factor, said mass consisting essentially of about 100 parts by weight of a rubbery copolymer of isobutylene and a diolefin in approximately the proportions of 98:2 and having a Mooney value of about 30–40, about 10 parts of polyisobutylene having a molecular weight of at least about 60,000, about 25–50 parts of heavy paraffin oil, about 40–80 parts of inorganic finely particulate stiffener, and about 4–15 parts of polyethylene; and said mass surrounding the connection being further smoothly covered with a wrapping of stretchable elastic pressure-sensitive adhesive tape as a final protective covering.

12. An insulated and protected electrically conductive metallic connection between metallic conductors, having an irregular angular contour difficult to cover smoothly with conventional covering materials such as pressure-sensitive adhesive tape; said connection being preliminarily at least partially surrounded with a smoothly contoured, compact, unitary, close-fitting, adherent mass of a plastic, highly coherent filler composition adapted for hand application in the form of a self-sustaining strip or tape and having high dielectric strength and low dissipation factor, said mass consisting essentially of about 110 parts by weight of a rubbery hydrocarbon polymer base at least mainly consisting of a rubbery copolymer of isobutylene and a diolefin in approximately the proportions of 98:2, about 4–15 parts of polyethylene, about 40–80 parts of inorganic finely particulate stiffener, about 25–50 parts of paraffin oil plasticizer, and about 5–30 parts of tackifier resin; and said mass surrounding the connection being further smoothly covered with a wrapping of stretchable elastic pressure-sensitive adhesive tape as a final protective covering.

References Cited in the file of this patent

UNITED STATES PATENTS

| | | |
|---|---|---|
| 2,383,839 | Beekley | Aug. 28, 1945 |
| 2,414,300 | Hamilton | Jan. 14, 1947 |
| 2,451,865 | O'Brien | Oct. 19, 1948 |
| 2,459,891 | Nelson et al. | Jan. 25, 1949 |
| 2,460,181 | Marshall | Jan. 25, 1949 |
| 2,656,297 | Davis et al. | Oct. 20, 1953 |

FOREIGN PATENTS

| | | |
|---|---|---|
| 578,298 | Great Britain | June 24, 1946 |